May 23, 1950  J. R. MAY  2,509,104
PROPELLER CONTROL
Filed Nov. 17, 1943  2 Sheets-Sheet 1

INVENTOR
JAMES R. MAY

ATTORNEYS

May 23, 1950  J. R. MAY  2,509,104
PROPELLER CONTROL
Filed Nov. 17, 1943  2 Sheets-Sheet 2

INVENTOR
JAMES R. MAY
ATTORNEYS

Patented May 23, 1950

2,509,104

UNITED STATES PATENT OFFICE 2,509,104

PROPELLER CONTROL

James Russell May, Dayton, Ohio, assignor to General Motors Corporation, Detroit, Mich., a corporation of Delaware Application November 17, 1943, Serial No. 510,673

6 Claims. (Cl. 170—160.21)

This invention relates to regulator mechanism for fluid actuated pitch shifting mechanism of aircraft propellers, and has for an object to simplify governor valve construction, and the control linkage therefor.

Another object of the invention is to provide a governor valve and control linkage suitable for use in a rotating reservoir, that may be manually adjusted or set from a remote point outside the reservoir while the reservoir is rotating.

Another object is to provide a governor valve of the floating type, that responds to the domination of centrifugal force over substantially constant spring force for all conditions, and in which a porting sleeve is movable for selecting the response position of the valve.

Another object of the invention is to provide a regulator mechanism and enclosed fluid operated control elements that can be mounted on and rotate with a propeller mechanism and controlled from a remote point without the objection of leakage.

Yet another object of the invention is to provide a sealed regulator mechanism that may be constructed as an integral unit of a propeller mechanism with outside controls which necessitates no build-up of structure at the time of assembly of propeller on engine shaft.

Further objects and advantages of the present invention will be apparent from the following description, reference being had to the accompanying drawings wherein a preferred embodiment of the present invention is clearly shown.

Figure 1:
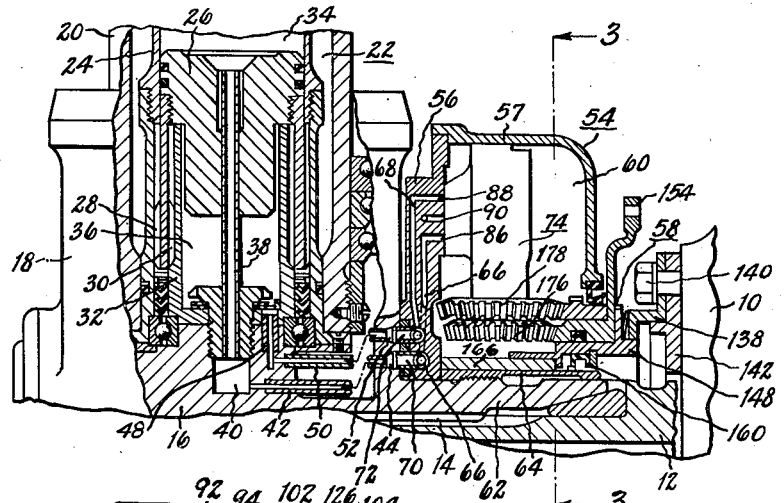
Fig. 1 is a fragmentary view in section showing the structure of the instant invention in elevation as applied to an aircraft propeller it being a view substantially as indicated by the line and arrows 1—1 of Fig. 3.

With particular reference to the drawings, 10 refers to an engine housing or gear-casing from which extends in rotatable relation to be driven by the engine, a propeller shaft 12, splined at 14 to drivingly engage a propeller hub 16 providing a plurality of sockets 18 for rotatably securing blades 20. In each blade root there is contained a torque unit 22 comprising a cylinder 24 and a double acting piston 26 which by its spiral spline connection 28 between the piston and cylinder, and the spiral spline connection 30 between the piston and a hollow spindle 32 secured to the hub, is adapted to effect rotary motion of the blade within its bearings in the socket as the piston moves inward or outward of the cylinder in response to pressure fluid applied to either of the chambers 34 or 36, at either end of the piston. Application of fluid pressure to the chamber 34 is accomplished by a tube 38 secured in the hub 16 and projecting in sliding relation through the piston, which communicates with a recess 40 from which there leads a transfer tube 42 ending in an orifice 44 on the surface of the socket. Application of fluid pressure to the chamber 36 is through the base of the spindle 32 by means of a tube 48 connecting with a transfer tube 50 ending in an orifice 52. So much of the structure is described in more detail in the U. S. patent to Blanchard et al. 2,307,101.

For selectively or automatically controlling the application of fluid pressure to either of the chambers 34, 36, there is provided a regulator 54 that comprises an annular plate 56, a cover 57, and an adapter assembly 58 secured together as a unit to form a reservoir 60 of annular form mounted on a rear extension 62 of the hub by a sleeve nut 64, so as to be rigid and rotate with the propeller hub structure. The reservoir thus comprises an annular chamber that is charged to a desired degree with a suitable operating fluid, such as a light oil, and houses the fluid actuated devices and pressure developing devices for effecting control to a predetermined pattern. The annular plate 56 seats against the surface of the blade sockets 18 and has combined passages 66 and 68 circumscribing the shaft and fitted for communication with the transfer tubes 44 and 52 respectively by branches 70 and 72 respectively. It is to be understood that each of the blade sockets is fitted with the transfer tubes 42 and 50, and that each of the control passages 66 and 68 connect with all of the transfer tubes 42 and 50 by the orifices 44 and 52 respectively.

Mounted on the surface of the plate 56 so as to be contained within the reservoir there is a governor valve unit 74, a relief valve unit 76 and a pressure developing unit 78, the latter of which is a constant delivery gear type pump adapted to draw fluid from the reservoir 60 and deliver it under pressure into a pressure passage 80 located in the body of the plate and leading to the relief valve 76, and on to the governor valve unit 74. To complete fluid connection with the governor valve unit 74 the plate has tubular branches 82 and 84 extending from the control passages 66 and 68 respectively that end in ports 86 and 88 on each side of a port 90 in the pressure line 89.

Figure 2:
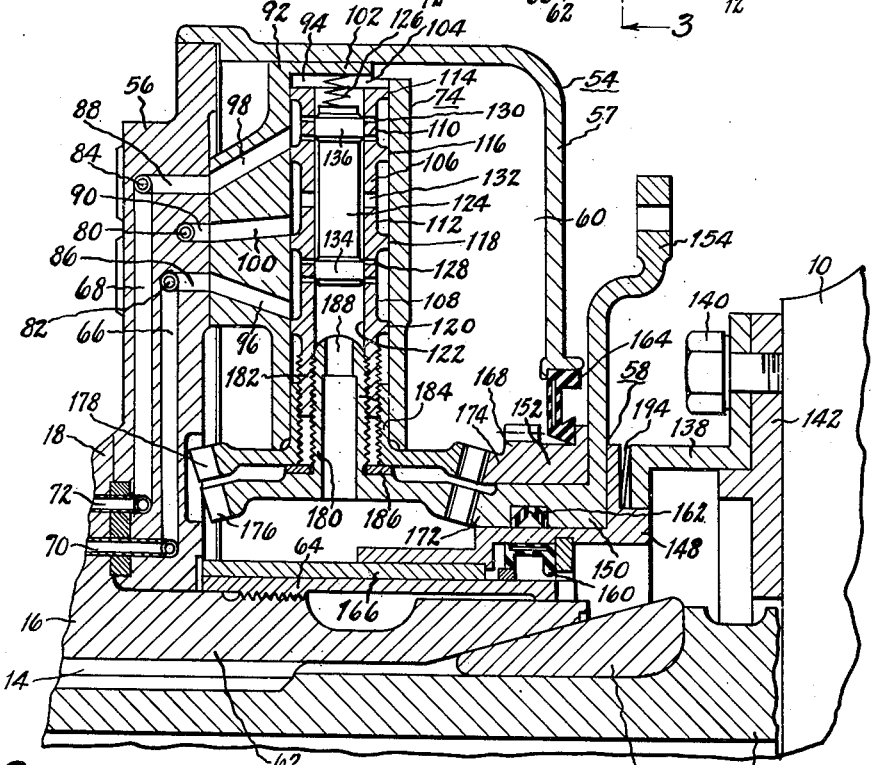
Fig. 2 is an enlarged view in section through the improved governor valve unit as suggested by the line and arrows 2—2 of Fig. 3.
Figure 4:
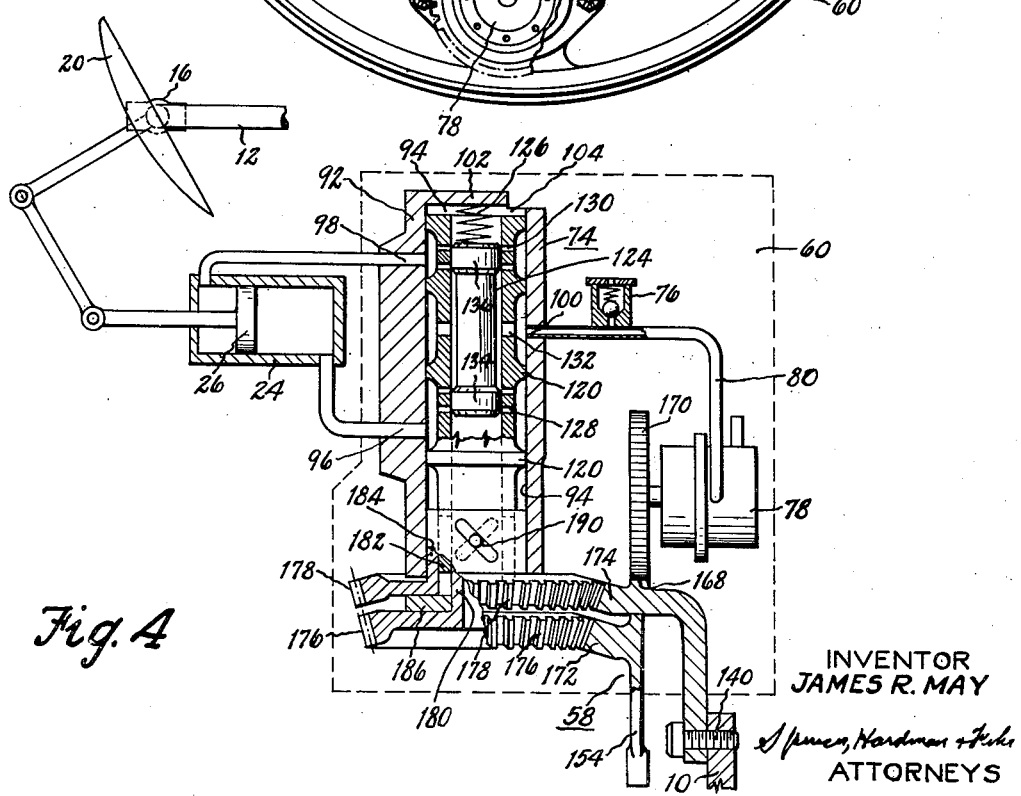
Fig. 4 is a diagrammatic view of a fluid shifted propeller mechanism wherein the control circuit embodies the structure herein described.

The governor valve unit is mounted over the ports 86, 88 and 90 and is adapted to control the flow of fluid under pressure from the pressure port 90 to either of the control ports 86, 88 whenever the valve element is moved in either direction from the equilibrium position shown in Figs. 2 and 4. Essentially, the unit comprises a body or block 92 having a bore or pocket 94 with spaced ports 96, 98 and 100 designed to communicate with plate ports 86, 88 and 90 respectively. One end of the bore 94 is or may be closed partly by a head 102, though an opening 104 is provided that relieves the end of the bore to the reservoir 60. Fixed for sliding and rotary movement within the bore 94 there is a porting sleeve 106 having peripheral grooves 108, 110 and 112 that are disposed between the peripheral ribs 114, 116, 118 and 120 to provide annular chambers between the sleeve and body constantly communicating with the ports 96, 98 and 100. The porting sleeve has an axial bore 122 housing a valve element 124 and a spring 126, while cross ports in sets, such as 128, 130 and 132 connect the bore of the porting sleeve with the annular chambers 108, 110 and 112 respectively.

The valve element 124 is an elongated cylindrical weight member designed to respond to centrifugal force of regulator rotation and has two spaced ribs or lands 134 and 136 so spaced as to equally overlay the ports 128 and 130 when the valve is in the equilibrium position. Thus, the annular space between the lands is always exposed to the pressure of the port 132. The arrangement of the governor valve unit is such that the plunger 124 and porting sleeve are disposed on a radius of regulator rotation under which conditions the valve element moves radially outward as the speed of rotation increases and variously compresses the spring 126. That condition will obtain until the spring force equals the centrifugal force when the valve element will come to rest in what is called the equilibrium position. The equilibrium position is determined, and in fact selected, by means shifting the porting sleeve 106 along the bore of the block 92. Thus the speed level at which the governor valve unit will control the propeller mechanism to constant speed operation is manually selectable and is predetermined by positioning the porting sleeve 106.

Figure 5:
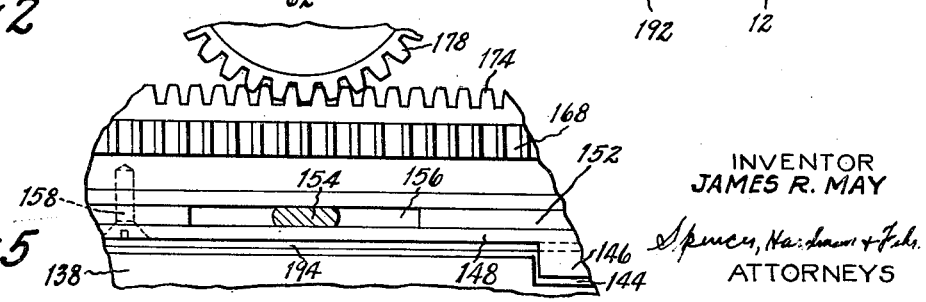
Fig. 5 is a fragmentary view illustrating details of control linkage by which the governor valve is adjusted.
Figure 3:
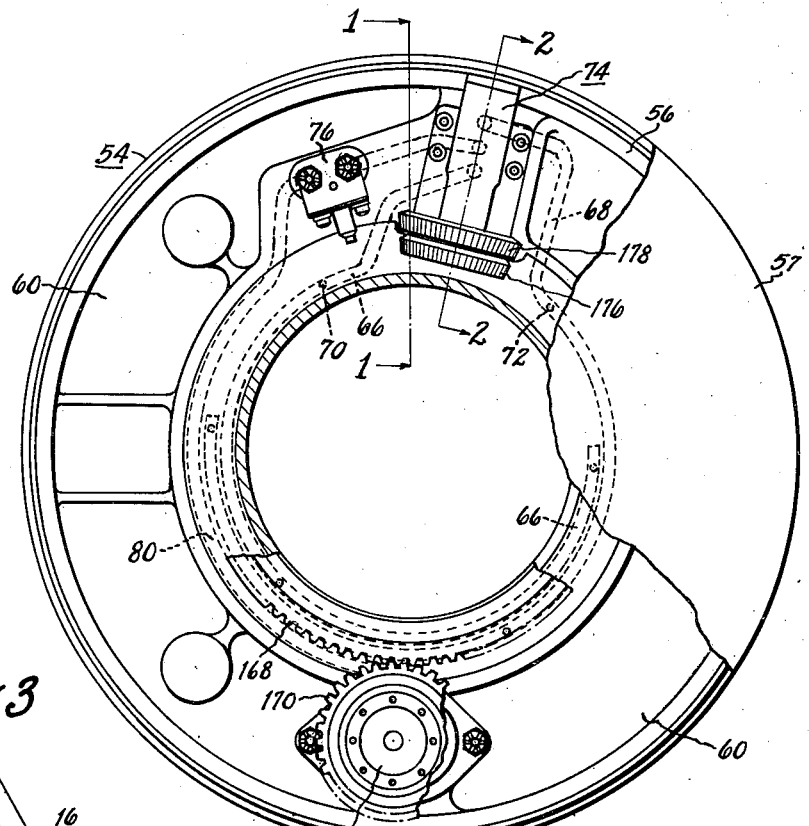
Fig. 3 is a transverse sectional view through the propeller mechanism substantially as shown in Fig. 1 by the line and arrows 3—3.

Positioning of the porting sleeve along the bore of the block is determined by the adapter assembly 58, and comprises an adapter plate 138 secured to the engine nose 10 by screw devices 140 that also secure a pilot plate 142 thereto. The adapter plate provides a notch 144 receptive of a lug 146 of a sleeve 148 forming a support for a pair of concentric rings 150, 152 secured thereto and extending into the reservoir 60. The ring 150 is journalled for oscillation about the sleeve 148 through the limits defined by a lateral arm 154 extending radially through a notch 156 in the ring 152 which is secured to the sleeve 148 by screw devices 158 as suggested in Fig. 5. Fluid seals 160, 162, and 164 are provided between the sleeve nut 64 and the sleeve 148, between the sleeve 148 and the ring 150, and between the ring 152 and the cover 57 respectively, so that there will be little or no loss of operating fluid from the reservoir between relatively moving parts.

The adapter assembly 58 is therefore restrained against rotation with the reservoir due to the lug and notch engagement 144, 146, yet the adapter assembly, or that part of it extending into the reservoir, is capable of wobbling to the extent of following any eccentricity of the sleeve 166 about which it is journalled. Within the reservoir the ring 152 provides a toothed flange 168 engageable with a pinion 170 mounted on the pump 78, which operates to drive the pump whenever the propeller rotates. Both of the rings 150 and 152 end inside of the reservoir with beveled toothed racks 172, 174 each of which meshes with a beveled pinion 176, 178 having a bearing in the bore of the block 92. The gear 176 has an axial tubular extension 180, the outside of which is threaded to engage threads within a tubular extension 182 of the porting sleeve 106, while the gear 178 has an axial tubular extension 184, the inside of which is threaded to engage threads on the outside of the tubular extension 182, there being a thrust washer 186 between the gears. The extension 184 is journalled in the bore 94, while the extension 180 is opened out at 188 to communicate with the bore of the porting sleeve 106. The threads of the two extensions are of opposite pitch so that relative rotation of the gears will tend to thread the extensions into or out of the porting sleeve depending on the direction of the relative rotation. The condition of that coupling is more clearly shown in Fig. 4 where the threads are graphically shown by the cross slot and pin means 190.

The structure thus embodied provides propeller mechanism consisting of a hub, blades, torque units, and regulator mechanism complete as a self-contained unit, in the reservoir of which the control apparatus is enclosed and flushed with the pressure operating medium or liquid. It is adapted for complete assembly at the factory to the inclusion of the adapter assembly ending with the sleeve 148. It is then ready for installation upon the propeller shaft, or it may be shipped to the field in that state where it may be installed on the propeller shaft as a replacement for one removed. In making the installation it is only necessary to remove the usual shaft nut retaining the propeller on the shaft, and then pass the new propeller mechanism over the shaft to seat upon the rear cone 192, there being interposed a dished thrust spring 194 between the sleeve 148 and the adapter plate 138. Piloting the lug 146 of the sleeve 148 into the notch 144 of the adapter plate 138 will permit the parts moving into proper relation, and securing of the usual shaft nut and hooking up the manual linkage from the cockpit to the lever 154 makes the installation complete.

When in operation, the regulator will rotate with the propeller around the adapter assembly which effects rotation of the pump 78 to feed the fluid passages with the pressure operating medium that finds its way to the port 100 with the excess spilling out through the relief valve unit 76 to return to the reservoir 60. Since the regulator is rotating about the adapter assembly so long as the propeller is in operation, the toothed flanges 172 and 174 effect the rotation of the gears 176 and 178, which in turn, there being no relative rotation between the gears, cause the porting sleeve and the gears 176 and 178 to rotate as a unitary structure about the axis of the valve. That effects elimination of static friction between the porting sleeve 106 and the valve element 124, so that the latter is always free to move upon the slightest change in balancing force. The balancing force is the result of centrifugal force of rotation applied to the valve element 124 which is in itself a centrifugal member, and the spring force accomplished by the outward movement of the valve element against the spring 126. When those forces are balanced an equilibrium position of the valve is reached in which the lands 134 and 136 will just cover the control ports 128 and 130. Should there be a tendency for the propeller to overspeed the valve element will move radially outward to open the port 130 to the pressure port 132, and there will result a pressure impulse upon the piston of the torque unit to increase the pitch of the blades accordingly. At the same time the port 128 will have been opened to drain so that the opposite side of the torque unit may be relieved through the opening 188 and return to the reservoir. Similarly, on an underspeed condition, the valve element moves radially inward because of the spring force dominating the centrifugal force, which opens the port 128 to the pressure line and the torque unit to relief through the port 130 and return to the reservoir through 104.

The foregoing is the operation of the governor valve unit in its constant speed control of the propeller for any one selected setting of the porting sleeve. The porting sleeve may be moved radially inward or outward during rotation of the propeller for selecting a new speed level at which the control will be effected. For selecting a different speed level of control, the lever 154 is caused to be moved to the desired position, which effects relative rotation between the rings 150 and 152. Their toothed flanges 172 and 174 thereby effect relative rotation of the gears 176 and 178 that cause the porting sleeve 106 to move axially along the bore of the block 92. That axial movement of the sleeve shifts the control ports radially inward or outward with respect to the axis of rotation. In consequence thereof, the valve element will now cover the ports 128 and 130 at a new equilibrium position. Assuming for the purpose of illustration that the shift of the porting sleeve has taken up a position radially inward of that before, then it will require a lower propeller speed to develop sufficient centrifugal force on the element 124 to move it to a position for covering the control ports. Hence the valve unit will control at a lower speed level.

While the embodiment of the present invention as herein disclosed, constitutes a preferred form, it is to be understood that other forms might be adopted, all coming within the scope of the claims which follow.

What is claimed is as follows:

1. A propeller control mechanism for an hydraulically adjustable propeller of the character described comprising, a rotatable support having a pair of radially spaced control passages and an intervening pressure supply passage, means for rotating said support, a control valve unit mounted on the support and having a bore extending radially of the axis of support rotation, a shiftable porting sleeve carried by the bore and providing a fluid source port and a pair of spaced flow ports connected with the source and control passages respectively, a landed valve element shiftable within the porting sleeve for selectively connecting the source port with either of the flow ports, in response to centrifugal force means including a spring and rigid seat for applying a predetermined force to said valve in opposition to said centrifugal force to effect adjustment thereof, and means for varying and predetermining the relation of the sleeve to the valve element including a ring non-rotatable with the support but oscillatable relative thereto, control means for effecting arcuate shifting of said ring, a gear rotatable with said valve and having operative engagement with said ring for rotary movement in response to the shifting thereof, and means actuated by said gear for varying the effective position of said porting sleeve relative to said regulator valve in response to adjustment of said control means.

2. A fluid flow control device comprising a rotatably mounted support having a plurality of flow passages and an intervening supply passage, means for rotating said support, a valve housing mounted on the support and having a bore disposed radially of the axis of support rotation with spaced passages opening from the bore thereof to the support passages, a porting sleeve shiftably disposed in the bore of the valve housing and having lineally spaced ports communicating with the housing passages, a valve element movable within the porting sleeve and having a pair of spaced lands adapted to control fluid flow from one of the said ports to either of the other ports of the sleeve, yielding means resisting outward radial movement of the valve element along the porting sleeve in response to centrifugal force whereby the valve element responds to variations in the speed of support rotation for connecting said one port with one or another of the other ports, a pair of gears disposed at one end of the valve housing and having axial extensions threaded one into and one onto the porting sleeve, means normally rotating the gears at equal speeds due to support rotation thereby effecting rotation of the porting sleeve within the valve housing for the elimination of static friction, and means for effecting differential rotation of the gears whereby the porting sleeve is moved along the bore of the housing to select a different position at which the valve element will cover the ports thereof.

3. A fluid flow control device comprising a rotatably mounted support having a plurality of flow passages and an intervening supply passage, means for effecting rotation of said support, a valve housing having a tubular bore so mounted on the support that the tubular bore extends radially of the axis of support rotation, said housing having laterally spaced flow and inlet passages respectively, communicating with the bore and with the support passages, a porting sleeve shiftably disposed in the housing bore and having lineally spaced flow and inlet ports communicating with the housing passages, a floating valve element movable within the porting sleeve having a pair of spaced lands adapted to coincide with the flow ports and to control flow from the inlet port to the flow ports, yielding means arranged to balance the valve element against centrifugal force of the valve element set up by rotation of the support whereby the valve element responds to variations in the speed of rotation of the support for covering and uncovering the flow ports in the sleeve, a pair of gears having extensions extending into one end of the housing bore and interengaging with the porting sleeve, a pair of rotatable racks for driving said gears at equal speed, means for differentially rotating said racks, the interengagement of said extensions with the porting sleeve being such that equal rotational speed of the gears effects rotation of the sleeve within the housing and differential rotation of said gears effects lineal movement of the porting sleeve along the bore of the housing relative to the valve element.

4. A fluid flow control device comprising a rotatably mounted support having a plurality of flow passages and an intervening supply passage, means for effecting rotation of said support, a valve housing having a tubular bore so mounted on the support that the tubular bore extends radially of the axis of support rotation, said housing having laterally spaced flow and inlet passages respectively, communicating with the bore and with the support passages, a porting sleeve shiftably disposed in the housing bore and having lineally spaced flow and inlet ports communicating with the housing passages, a floating valve element movable within the porting sleeve having a pair of spaced lands adapted to coincide with the flow ports and to control flow from the inlet port to the flow ports, yielding means arranged to balance the valve element against centrifugal force of the valve element set up by rotation of the support whereby the valve element responds to variations in the speed of rotation of the support for covering and uncovering the flow ports in the sleeve, a pair of concentric gears having hubs each threadedly engaging said porting sleeve, and means for rotating said porting sleeve within the valve body for eliminating static friction of valve plunger movement and including a pair of circular racks intermeshing with said concentric gears and means for adjusting the porting sleeve along the bore of the valve body for selecting the predetermined conditions at which the centrifugal force and spring force will be in balance so as to stop communication between the pressure port and the control port said last named means including means for rotating one of the circular racks relative to the other circular rack.

5. In a hydraulic regulator for a rotatable device having a valve element movable radially of the axis of rotation in response to speed change of rotation for controlling the flow of fluid pressure from a supply port to a control port, adjustable means for selecting the radial position at which the valve element will effect control, comprising in combination, a porting sleeve having ports cooperable with the valve element and being movable relative thereto, a pair of pinions concentrically arranged and each having a part threadedly engaged by the porting sleeve, a pair of concentric ring gears fixedly supported outside the rotatable device and each engaged by one of the concentrically arranged pinions, means whereby one of the ring gears is rotatable relative to the other, and means whereby rotation of the device causes the pinions to roll over the ring gears and effect rotation of the porting sleeve, relative rotation of the ring gears effecting differential rotation of the pinions and superimposing a radial movement of the porting sleeve upon its rotary movement.

6. In a hydraulic regulator for a rotatable device having a valve element movable radially of the axis of rotation in response to speed change of rotation to assume a radial position that is an index of the speed of rotation, a shiftable porting sleeve guiding the valve element and providing a fluid supply port and a control port cooperable with the valve element for controlling the flow of fluid from the supply port to the control port, adjusting means for shifting the porting sleeve to select the radial position at which the valve element will close the control port, said adjusting means including a pair of pinions having concentric portions each having threaded engagement with one end of the porting sleeve, a pair of relatively rotatable ring gears each meshing with one of said pinions, means fixedly supporting the ring gears so that rotation of the device causes the pinions to roll over the ring gears and effect rotation of the porting sleeve, means for rotating one of the ring gears relative to the other so that the pinions will be differentially rotated and effect radial shifting of the porting sleeve whereby a new radial position will be selected at which the valve element will close the control port.

JAMES RUSSELL MAY.

REFERENCES CITED

The following references are of record in the file of this patent:

UNITED STATES PATENTS

| Number | Name | Date |
|---|---|---|
| 1,941,372 | Warner | Dec. 26, 1933 |
| 2,292,805 | Tippen | Aug. 11, 1942 |
| 2,307,101 | Blanchard et al. | Jan. 5, 1943 |
| 2,307,102 | Blanchard et al. | Jan. 5, 1943 |
| 2,391,699 | Haines et al. | Dec. 25, 1945 |
| 2,407,791 | Martin et al. | Sept. 17, 1946 |

FOREIGN PATENTS

| Number | Country | Date |
|---|---|---|
| 701,179 | France | Jan. 5, 1931 |
| 703,319 | Germany | Feb. 6, 1941 |